Feb. 19, 1952     R. L. BROWN     2,585,996
MOLDING FASTENER
Filed Sept. 12, 1946

Inventor
ROBERT L. BROWN,
By Walter S. Jones
Attorney

Patented Feb. 19, 1952

2,585,996

UNITED STATES PATENT OFFICE 2,585,996

MOLDING FASTENER

Robert L. Brown, Ferndale, Mich., assignor to United-Carr Fastener Corporation, Cambridge, Mass., a corporation of Massachusetts Application September 12, 1946, Serial No. 696,453

1 Claim. (Cl. 24—73)

The present invention relates to improvements in fasteners and more particularly to fasteners for attaching hollow channel-like moldings and similar parts to a supporting surface.

One of the primary objects of the invention is the provision of an improved molding fastener which may be preliminarily attached to a support and on which a resilient channelled molding may be locked by a snap action as a result of pressing the molding on the fastener.

A further object of the invention, according to one embodiment thereof, is the provision of a molding fastener of the type above described which may be readily non-rotatably attached to a support, as for example a car sill.

A still further object of the invention is generally to improve and simplify existing fasteners for the above stated purpose to the end that the fastener may be more cheaply made.

The above and other objects of the invention will be apparent to persons skilled in the art to which the invention relates from a consideration of the accompanying drawings and annexed specification illustrating and describing a preferred form of the invention.

In the drawings

Figure 1:
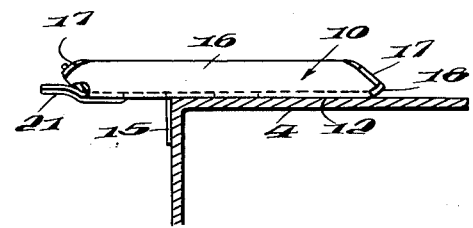
Fig. 1 is a sectional view of an installation showing my improved fastener in assembled relation with a portion of a car sill.
Figure 2:
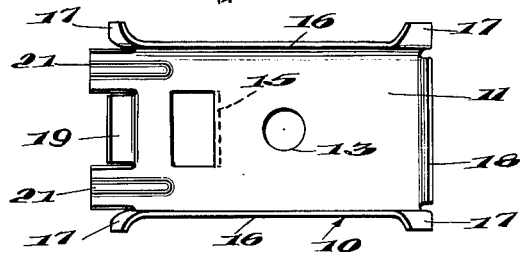
Fig. 2 is a top plan view of the fastener.
Figure 3:
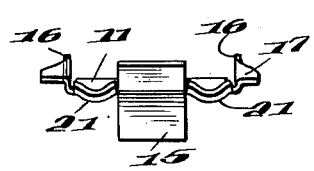
Fig. 3 is an end elevation of the fastener as viewed from one end thereof.
Figure 4:
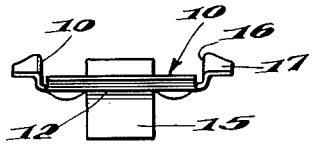
Fig. 4 is an end elevation of the fastener as viewed from the end opposite that illustrated in Fig. 3.
Figure 5:
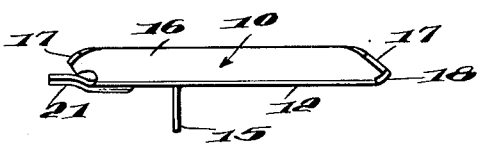
Fig. 5 is a side elevation of the fastener.

Referring to the drawings, the improved fastener is particularly adaptable to securing a hollow channel molding 1, which normally includes an arcuate body 2 having spaced inwardly directed flanges 3 to a support 4. The molding is usually a transversely expansible member being made of resilient sheet material such as sheet metal or sheet plastic material so that the flanges 3 are expansible outwardly upon application of pressure upon an opposite surface of the molding. The support 4 may be any suitable support but conveniently may be a sill of a motor vehicle body to which a molding is to be attached.

The fastener member 10 preferably comprises a body portion 11 having a support-engaging surface 12, said body portion being apertured as at 13 for the passage of a suitable fastening, for example a screw 14 for securing the fastener member 10 to the support. The body portion 11 may be provided with an outwardly extending tongue 15 struck from the body 11 within the marginal edges thereof and adapted to engage a surface or edge of the support so as to prevent turning of the fastener member 10 relative to the support 4.

The fastener 10 may be conveniently formed from a channel section providing longitudinal side flanges 16 on opposite sides of an intermediate web or body 11. The terminal ends and corners of these flanges 16 are bent outwardly to provide molding flange-engaging cams or wings 17 and these cams 17 slope inwardly from the outer edges of the flanges 16 toward the ends thereof. A locking lug 18 integrally joined to the web 11 at one end of the fastener member extends upwardly out of the plane of the web 11. At the opposite end of the fastener member, a locking lug 19 is provided which extends upwardly out of the plane of the web 11 and, in my preferred form, is disposed between flange supporting extentions 21 of the web 11.

After the fastener member 10 has been attached to the support 4, as above described, and as illustrated in the drawing, the molding may be applied and snapped thereon by expanding the side flanges of the molding over the locking edges or surfaces 17. One way to effect the above described attachment is to position the molding upon the fastener 10 with the flanges 3 bearing against the cams 17. Thereafter, by applying pressure on the outer face of the molding as indicated by the arrow 20, the molding flanges 3 will be expanded outwardly by the cams 17 until the inner edges of the flanges 3 ride off of the ends of the cams 17; whereupon the flanges 3 will snap under the free edges of the locking lugs 18 and 19.

It will be apparent to persons skilled in the art that, although desirable, the cam wings 17 need not be positioned at both ends of the body 10. Obviously one molding flange 3 may be hooked under a locking lug at one end of the body and the opposite side snapped over the cams 17 and under the locking lug at the opposite end of the body.

Figure 6:
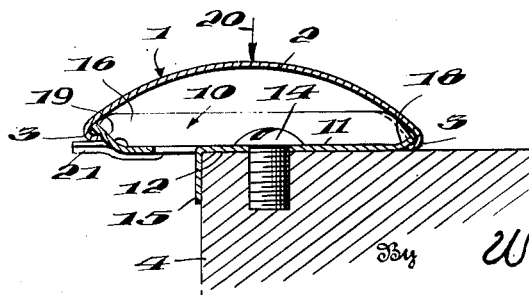
Fig. 6 is an enlarged sectional view of the fastener illustrating a molding secured thereto.

In some installations it is desirable that one side edge of the molding be positioned beyond the support, as is illustrated in Figs. 1 and 6. In such cases it is necessary to provide the molding flange-supporting portions 21 beyond the locking lug 19 and the end of the fastener which projects beyond the support. Such supporting portions 21 may be provided by extending the body or web 11 beyond the intermediate locking lug 19 as illustrated in Fig. 1.

Although I have illustrated and described one form of the invention as a preferred embodiment, I do not wish to be limited thereby as the scope of the invention is best defined by the appended claim.

I claim:

A fastener for securing a channel-shaped molding to a support comprising a substantially flat sheet metal support-engaging body portion, locking lugs at opposite ends of said body portion extending laterally out of the plane thereof for locking engagement with the inturned flanges of a molding, opposed flanges integrally connected to the side edges of said body portion and extending therealong substantially normal to the general plane thereof, the ends of said flanges adjacent said locking lugs being bent laterally outward to form molding-engaging cam members, said cam members having substantially flat camming surfaces projecting outwardly beyond said flanges and disposed in planes substantially normal thereto and inclined toward said body portion, said locking lugs being disposed intermediate said cam members, and said fastener having means whereby it may be secured to a supporting part.

ROBERT L. BROWN.

REFERENCES CITED

The following references are of record in the file of this patent:

UNITED STATES PATENTS

| Number | Name | Date |
|---|---|---|
| 2,015,754 | Koenig et al. | Oct. 1, 1935 |
| 2,108,398 | Allen | Feb. 15, 1938 |
| 2,187,322 | Jones | Jan. 16, 1940 |
| 2,201,335 | Cotter | May 21, 1940 |
| 2,221,124 | Wiley | Nov. 12, 1940 |
| 2,227,290 | Wiley | Dec. 31, 1940 |
| 2,306,460 | Meyer | Dec. 29, 1942 |
| 2,330,675 | Brown | Sept. 28, 1943 |

FOREIGN PATENTS

| Number | Country | Date |
|---|---|---|
| 481,493 | Great Britain | Mar. 11, 1938 |